United States Patent [19]

Fujii et al.

[11] Patent Number: 4,552,413
[45] Date of Patent: Nov. 12, 1985

[54] ANTI-SKID BRAKE CONTROL SYSTEM FOR AUTOMOBILES

[75] Inventors: Takashi Fujii; Masamoto Ando, both of Toyota; Takumi Nishimura, Chiryu, all of Japan

[73] Assignee: Aisin Seiki Kabushiki Kaisha, Kariya, Japan

[21] Appl. No.: 511,484

[22] Filed: Jul. 7, 1983

[30] Foreign Application Priority Data

Jul. 9, 1982 [JP] Japan .................. 57-120148

[51] Int. Cl.$^4$ ............................................. B60T 8/08
[52] U.S. Cl. ...................................... 303/106; 364/426
[58] Field of Search ................. 303/20, 105, 106, 109, 303/110, 119; 364/426

[56] References Cited

U.S. PATENT DOCUMENTS

| | | |
|---|---|---|
| 3,425,751 | 2/1969 | Wehde et al. |
| 3,549,211 | 12/1970 | Leiber |
| 3,741,612 | 6/1973 | Ando |
| 3,809,437 | 5/1974 | Inada et al. |
| 3,877,756 | 4/1975 | Inada et al. |
| 3,904,250 | 9/1975 | Kondo |
| 3,920,279 | 11/1975 | Inada et al. |
| 3,971,595 | 7/1976 | Kondo |
| 4,131,326 | 12/1978 | Takayama et al. |
| 4,212,500 | 7/1980 | Ando et al. |
| 4,266,833 | 5/1981 | Sato et al. ............... 303/106 |
| 4,269,456 | 5/1981 | Kondo et al. |
| 4,321,676 | 3/1982 | Ohmori et al. ........... 303/106 X |
| 4,395,761 | 7/1983 | Sato et al. ............... 303/106 X |

Primary Examiner—Duane A. Reger

Attorney, Agent, or Firm—Oblon, Fisher, Spivak, McClelland & Maier

[57] ABSTRACT

An anti-skid brake control system which includes a method and apparatus for anti-skid brake control of the vehicle utilizing a first and second electromagnetic valves that controls operation of the at least one rear wheel and at least one rear brake of the vehicle which includes the steps of registering a first predetermined rear wheel rotational velocity standard and a predetermined rear wheel receleration rate upon braking of the vehicle, registering an actual rear wheel deceleration rate of the vehicle, establishing a predetermined velocity differential for operation of the first electromagnetic valve, establishing a second predetermined rear wheel rotational velocity standard, calculating a time period for changing from the first velocity standard to the second velocity standard, comparing the predetermined deceleration rate with the actual deceleration rate, comparing the predetermined velocity differential with the difference between the first and second velocity standards when the actual deceleration rate is less than the predetermined deceleration rate, energizing the first electromagnetic valve when the difference between the first and second velocity standards is equal to the predetermined velocity differential, and automatically controlling operation of the rear brake by energizing and de-energizing the first and second electromagnetic valve by comparison of the time period of energizing the first electromagnetic valve with the calculated time period for changing from the first velocity standard to the second velocity standard.

12 Claims, 3 Drawing Figures 4,552,413

ANTI-SKID BRAKE CONTROL SYSTEM FOR AUTOMOBILES

BACKGROUND OF THE INVENTION

1. Field of the Invention

This invention relates to an anti-skid brake control system for automobiles.

2. Description of the Prior Art

An anti-skid brake control system for automobiles usually includes a speed sensing device for detecting wheel rotational speed and an actuator which controls the brake circuit between the master and wheel brake cylinders to reduce and increase the brake pressure at the wheel brake cylinders in response to signals from the speed sensing device. More particularly, when the sensor detects a locking tendency at the rear wheels, the computer actuates a fluid operated actuator to disconnect communication between the master cylinder and wheel brake cylinders and at the same time increase the volume of the brake circuit at the wheel brake cylinders to thereby reduce the braking pressure. Then when the sensor detects no further locking tendency of the wheels due to the pressure reducing actuation of the actuator, the computer discontinues actuation of the fluid actuator to thereby regain the brake pressure at the wheels. The rapid repetitions of this increase and decrease of wheel brake pressure for a very period of time during brake operation will protect the wheels from locking because of the excess braking force and because of slippery road conditions and therefore protect the vehicle from skidding which may naturally result in a serious accident.

The above type of anti-skid brake control system is disclosed, for example, in U.S. Pat. No. 3,877,756. Although this type is very reliable, it is necessary to install a relatively large size actuator within the brake circuit and to provide a fluid source for actuating the actuator.

Another related U.S. Pat. No. 3,549,211 discloses a similar anti-locking control system wherein there is no conventional actuator used. However, this system requires a pump for regaining pressure when a locking tendency ceases.

Further, U.S. Pat. No. 3,425,751 discloses a similar system. According to this system, an additional locking tendency may occur during pressure regaining operation.

SUMMARY OF THE INVENTION

The object of present invention is to provide an anti-skid control system for automobiles which serves to overcome the drawbacks of the prior art.

A further object of the present invention is to provide a bypass passage such that a pressure reducing or controlling valve is operated as a p-valve to reduce the rate of increase or pressure to the rear brakes of the vehicle during braking so as to not have any further locking tendency while the system is in a pressure regaining stage.

BRIEF DESCRIPTION OF THE DRAWINGS

Various objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
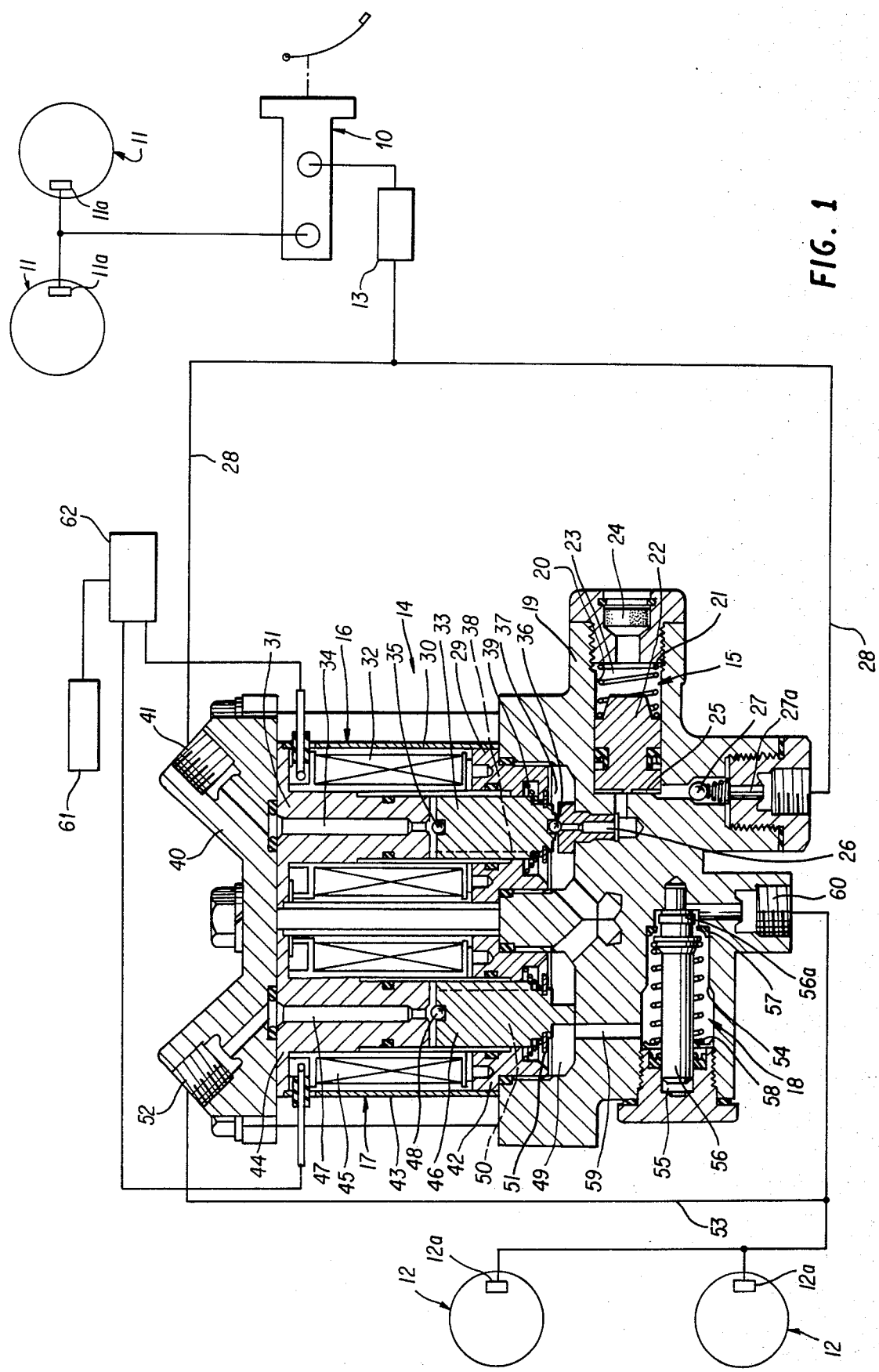
FIG. 1 illustrates a cross-sectional view of anti-skid brake control system in accordance with the present invention.

In FIG. 1, numeral 10 designates a tandem brake master cylinder which is hydraulically connected to a first brake circuit (front wheel brake cylinders 11a, 11a of vehicle front wheels 11,11) and a second brake circuit (rear wheel brake cylinders 12a,12a of vehicle rear wheels 12,12). The second brake circuit includes a proportioning valve 13 and hydraulic pressure control 14 between the rear wheel brake cylinders 12a,12a and the master cylinder 10.

The hydraulic pressure control 14 includes a rear wheel brake pressure reducing mechanism in the form of a reservoir 15 and first and second electromagnetic valves 16,17. The reservoir 15 is formed in a lower body portion 19 and includes a piston 22 slidably movable with a cylindrical bore 20. Spring 21 continuously biases the piston 22 toward the left as viewed in FIG. 1. An air chamber 23 is provided between the right axial side of the piston 22 and an air filter 24 positioned at the right end of the bore 20.

A hydraulic chamber 25 is provided at the left axial side of the piston 22 within the bore 20 and is connected to a discharge port 26 of the first electromagnetic valve 16. The chamber 25 is also hydraulically connected to conduit 28 through one-way valve 27 and exhaust port 27a.

The first electromagnetic valve 16 includes body members 29,30 and 31, first solenoid coil 32 and a first movable plunger 33. This movable plunger 33 has an upper ball 35 for opening and closing inlet port 34 and a lower ball 36 for opening and closing discharge port 26. The plunger 33 further includes groove 38 at an outer peripheral portion thereof for connecting the inlet port 34 with lower chamber 37. The plunger 33 is continuously biased downwardly by spring 39 for normally opening the inlet port 34 and closing the discharge port 26. The inlet port 34 is hydraulically connected to the conduit 28 through port 41 provided on upper body 40.

Second electromagnetic valve 17 includes body members 42,43 and 44, second solenoid coil 45 and second movable plunger 46. The second movable plunger 46 has an upper ball 48 for opening and closing discharge port 47 and a groove 50 at outer periphery for hydraulically connecting chamber 49 with the discharge port 47 through ball 48. The plunger 46 is continuously biased downward by spring 51 to normally open the discharge port 47 to chamber 49 which is in fluid communication with the chamber 37 of first electromagnetic valve 16. The discharge port 47 is connected to port 52 provided on upper body 40. The port 52 is hydraulically connected to rear wheel brake cylinders 12a,12a through conduit 53.

Pressure reducing or controlling valve 18 includes valve piston 56 movably disposed within a stepped bore 54a, cup-shaped valve seat 57 disposed in the bore 54 for cooperating with valve portion 56a of the piston 56 and a spring 58 for continuously urging the valve piston 56 toward the right as viewed in FIG. 1, which establishes fluid communication between port 60 which is hydraulically connected to the wheel brake cylinders 12a,12a and a passage 59 which is connected to chamber 49 of second electromagnetic valve 17. The structure and function of this pressure reducing valve 18 are similar to those of proportioning valve 13 and will therefore not be discussed in greater detail. However, the pressure turning point and pressure reducing rate are especially chosen to avoid wheel locking tendencies when the vehicle is running on an icy or freezing road.

The anti-skid control system in accordance with the present invention further includes a speed sensor 61 which detacts the rotational speed of rear wheels of the vehicle and a computer circuit 62 which energizes the first solenoid coil 32 when the sensor 61 detects any wheel locking tendency during braking operation and which de-energizes the first solenoid coil 32 and instead energizes the second solenoid coil 45 when the sensor detects the disappearance of the wheel locking tendency during the brake operation. This operational function of computer 62, sensor 61 and first and second electromagnetic valves 16,17 will be explained in greater detail with reference to FIG. 1 through FIG. 3.

In operation, when the ignition switch is OFF, a fail-safe or monitoring structure will be operated to check whether there is any malfunction or breakage of the first and second electromagnetic valves 16,17. If they are normal, the computer 62 counts the number of revolutions and indicates the wheel rotational speed Vw in response to the signal from the sensor 61. If there is something wrong with any of the valves 16,17 a warning light is turned on to inform the driver of the malfunction.

Figure 3:
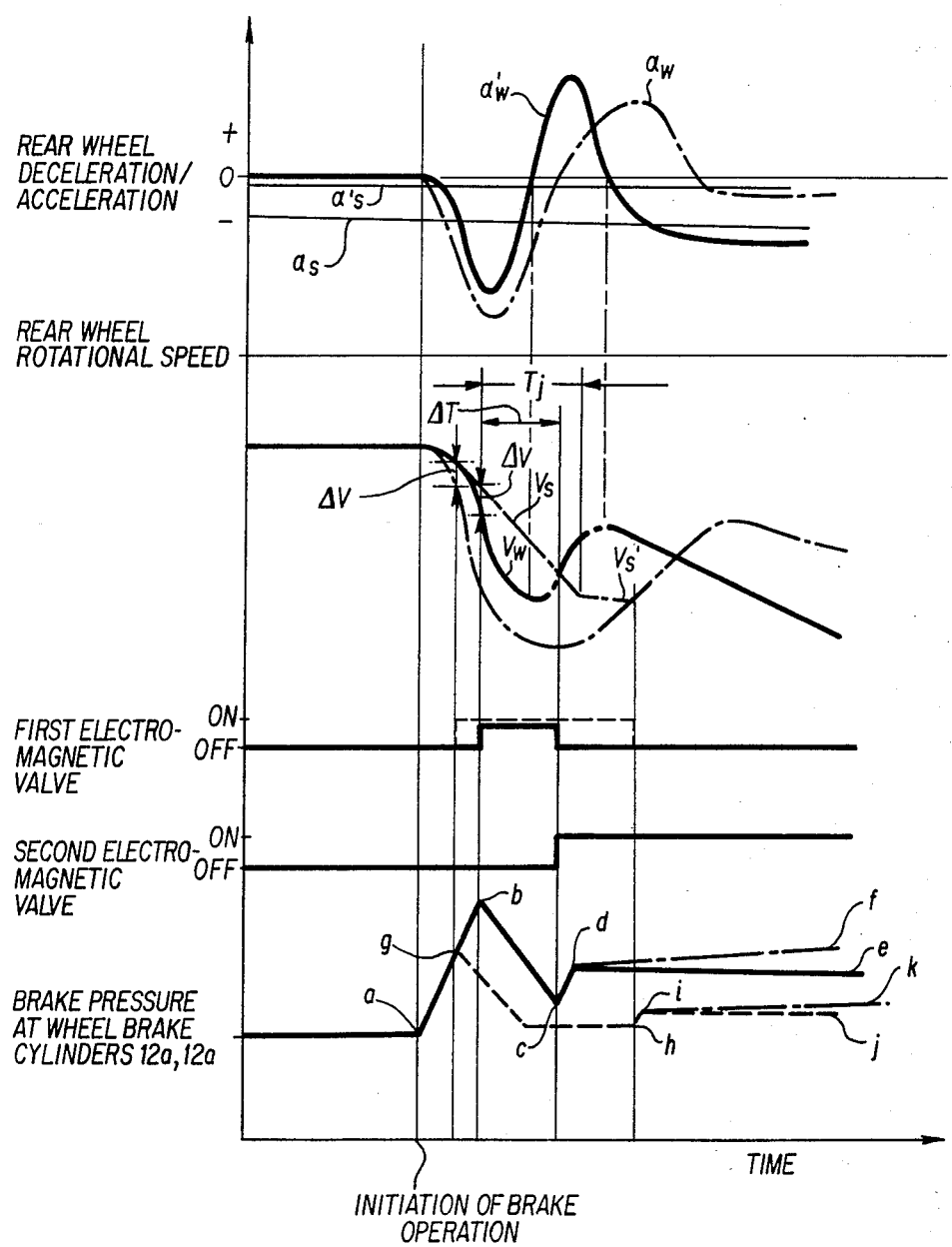
FIG. 3 discloses operational characteristics of various elements upon initiation of brake operation.

When the vehicle is running normally, the first and second electromagnetic valves 16,17 are in a non-operative condition as shown in FIG. 1. Under such conditions, when the brake pedal is operated to supply brake pressure to the wheel brake cylinders, the pressure to the front wheel brake cylinders 11a,11a is directly supplied from the front chamber of tandem master cylinder 10, while the pressure to rear wheel brake cylinders 12a,12a is supplied through p-valve 13 (which is not yet operated), conduit 28, port 41, inlet port 34, groove 38, chambers 37,49 and either through port 52 or port 60 and conduit 53. When such brake operation is performed on a relatively dry road, the brake pressure at which brake cylinders 12a,12a increases from point (a) to point (b) as illustrated in FIG. 3. Accordingly, the rotational velocity Vw of rear wheels 12,12 drops as shown by a solid line in FIG. 3.

When the pressure from the master cylinder 10 reached a predetermined peak pressure d, pressure reducing valve 18 is closed to keep passage 59 and port 60 disconnected. The predetermined peak pressure d of the pressure reducing valve 18 is determined by the cross-sectional area of large and small diameter portions of the valve piston 56 and the force of spring 58 in accordance with the following relationship:

$P_m$ denotes pressure in master cylinder 10 supplied by passage 59;
$P_w$ denotes the pressure of rear wheel cylinders 12a12a;
$A_2$ denotes a large diameter portion (valve portion 56a) of piston 56;
$A_1$ denotes a small diameter portion (end portion 56b) of piston 56; and
F denotes the force of spring 58 in the equation;

$$(A_2-A_1)P_m+F=A_2\times P_w.$$

Figure 2:
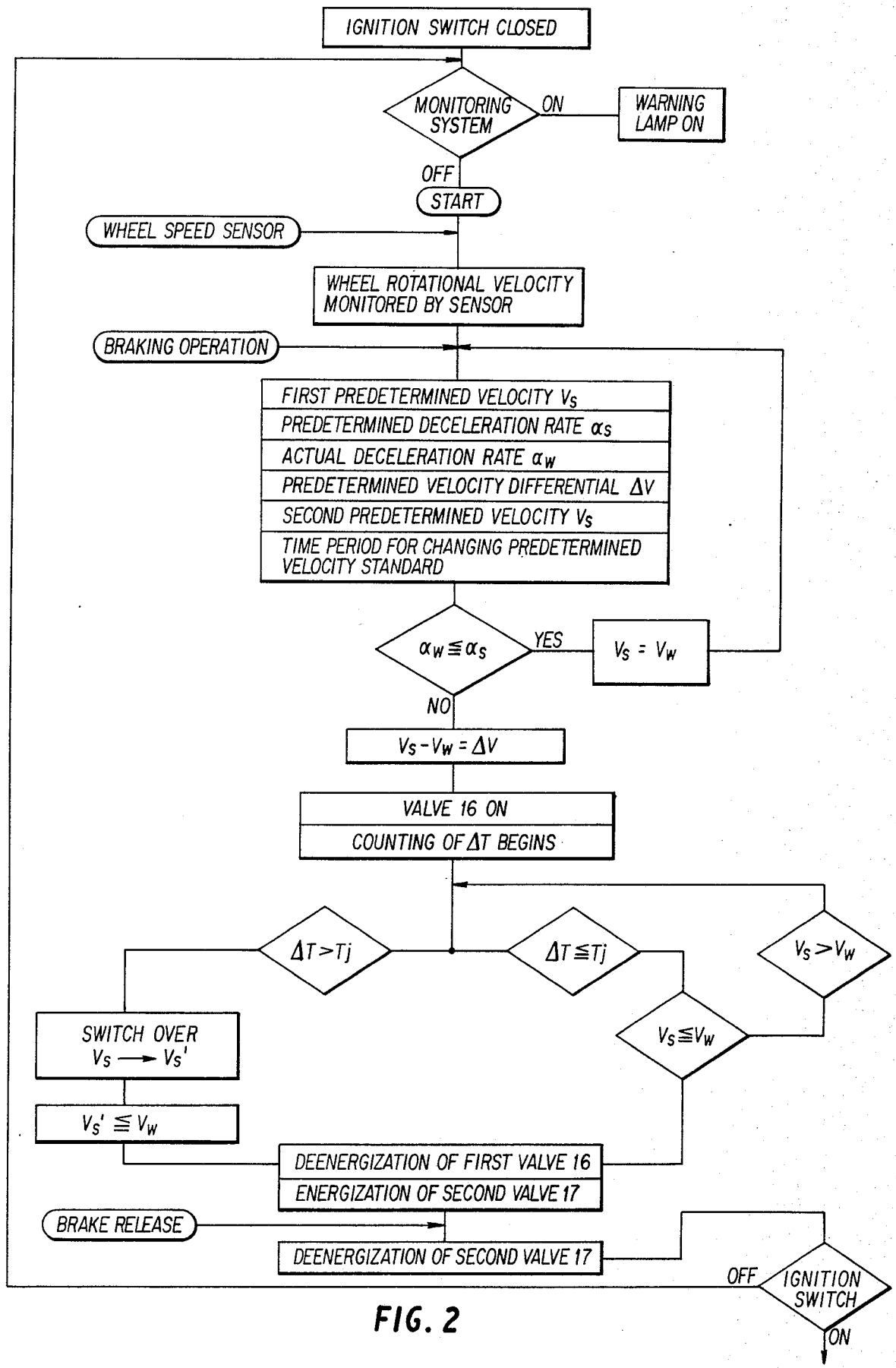
FIG. 2 shows a flow diagram illustrating the steps involved in operation of the present invention.

As is shown in FIG. 2, when the brake operation begins (such being easily sensed by providing a conventional brake pedal switch, not shown) computer 62 registers a first predetermined wheel rotational velocity standard Vs and an initial predetermined deceleration rate $\alpha s$, due to braking operation, registers the actual deceleration rate $\alpha w$, establishes a predetermined velocity differential $\Delta V$ for operating first electroteromagnetic valve 16, establishes a second predetermined velocity standard Vs' and calculates a time period Tj for changing the predetermined velocity standard from Vs to Vs'.

The computer 62 further subsequently compares the predetermined deceleration rate $\alpha s$ with the actual deceleration rate $\alpha w$. Moreover, when $\alpha w$ is less than $\alpha s$ the computer compares a velocity differential of Vs-Vw with velocity differential $\Delta V$. When Vs-Vw becomes equal to predetermined velocity differential $\Delta V$ (i.e. when the rear wheels have a locking tendency), the computer 62 energizes first electromagnetic valve 16 and begins recordation of time differential $\Delta T$.

When the solenoid coil 32 of first electromagnetic valve 16 is energized, the movable plunger 33 moves upwardly in FIG. 1 to close the inlet port 34 and at the same time to open discharge port 26. The pressure from the master cylinder 10 is then introduced to the reservoir chamber 25 to move the piston 22 to the right. Due to the hydraulic disconnection with the master cylinder 10 and the increase in volume, the pressure of the wheel brake cylinder 12a,12a is reduced from the point (b) to (c) as shown in FIG. 3. Then the rotational speed Vw of the rear sheels 12,12 begins to increase. The computer 62 compares Vs with Vw, until the $\Delta T>Tj$. When $Vs\leq Vw$ and before the time $\Delta T$ exceeds Tj, the computer 62 de-energizes solenoid 32 of first electromagnetic valve 16 and energizes solenoid 45 of second electromagnetic valve 17 and maintains the two valves 16,17 in such conditions until the braking operation ends.

Under these conditions, the first movable piunger 33 moves downward to thereby return the inlet and outlet ports 34,26 their and balls 35,36 of first electromagnetic valve 16 to original position shown in FIG. 1, while the second movable plunger 46 of the second electromagnetic vakve 17 is moved upward to close the outlet port 52. Thus the master cylinder pressure is again transmitted to rear wheel brake cylinders 12a,12a through p-valve 13, chambers 37,49, pressure reducing valve 18, port 60 and conduit 53. The pressure at the wheel brake cylinder 12a,12a increases accordingly (note line (c)–(d) in FIG. 3). After the pressure reaches point (d) in FIG. 3 (i.e. the turning point of pressure reducing valve 18), if the pressure from the master cylinder 10 is constant, the line will go from (d) to (e) (i.e. no pressure increase), and if the pressure from the master cylinder 10 is increased, the line will be (d)–(f).

The pressure at either line (d)–(f) or line (d)–(e) may be selected so to be an amount so as not to generate any further locking tendency of the wheels. Thus vehicle skidding is prevented during the braking operation on a dry surface road.

Referring now to the case where the vehicle is running on a slippery road (i.e. icy or wet road), the rotational speed Vw drops abruptly immediately after the sudden braking on said slippery road (see the line Vw with the chained and dotted line in FIG. 3). When the pressure at the wheel cylinders 12a,12a reaches the point (g) in FIG. 3, the difference (Vs-Vw) becomes ΔV so as to energize the solenoid coil 32 of the first electromagnetic valve 16.

Thus the pressure at wheel cylinders 12a,12a drops following the curve (g)-(h) in FIG. 3. The rotational speed Vw at the rear wheels 12,12 is then regained very slowly as compared with the case of a dry surface road.

Therefore, the value of Vs-Vw does not drop below zero before ΔT exceeds Tj and thus the computer 62 switches the Vs to Vs' to compare the value of Vs'-Vw with zero. If Vs'≦Vw, the computer 62 de-energizes the first electromagnetic valve 16 and energizes the second electromagnetic valve 17 until it receives a brake release signal (Which usually occurs upon release of the brake pedal). The pressure at wheel brake cylinders 12a,12a from the point (h) (in FIG. 3) becomes either (h)-(i)-(j) or (h)-(i)-(k). The pressurized fluid communicated into the reservoir chamber 25 will be recovered to the master cylinder 10 after the braking operation via one-way valve 27.

With regard to the p-valve 13, this will be used when the invention is actually practiced, however, the objects of the invention are attainable without it.

Obviously, numerous modifications and variations of the present invention are possible in light of the above teaching. It is therefore to be understood that within the scope of the appended claims, the invention may be practiced otherwise than as specifically described herein.

What is claimed as new and desired to be secured by Letters Patent of the United States is:

1. An anti-skid brake control system for a vehicle comprising:
   a master cylinder;
   at least one rear wheel brake cylinder;
   brake pressure circuit means for communication of said master cylinder with said rear wheel brake cylinder;
   hydraulic pressure control means for controlling hydraulic brake pressure supplied from said master cylinder to said rear wheel brake cylinder through said brake pressure circuit means, said hydraulic pressure control means comprising a first electromagnetic valve interposed between said master cylinder and said rear wheel brake cylinder and being operable to interrupt the communication between said master cylinder and said rear wheel brake cylinder and to establish the communication between said rear wheel brake cylinder and a reservoir upon energizing thereof, a second electromagnetic valve interposed between said first electromagnetic valve and said rear wheel brake cylinder and being normally open, and a pressure reducing valve interposed in parallel with said second electromagnetic valve between said first electromagnetic valve and said rear wheel brake cylinder; and
   means electrically connected with said hydraulic pressure control means for causing the energized position of said first electromagnetic valve upon generating the initial locking tendency at a rear wheel to reduce the hydraulic brake pressure, said means further being operable for causing the de-energized position of said first electromagnetic valve and for causing and maintaining the energized position of said second electromagnetic valve upon fading said initial locking tendency.

2. An anti-skid brake control system for a vehicle comprising:
   a master cylinder;
   at least one rear wheel brake cylinder;
   brake pressure circuit means for communication of said master cylinder with said at least one rear wheel brake cylinder;
   hydraulic pressure control means for controlling hydraulic brake pressure supplied from said master cylinder to said rear wheel brake cylinder through said brake pressure circuit means, said hydraulic pressure control means comprising a first electromagnetic valve interposed between said master cylinder and said rear wheel brake cylinder and being operable to interrupt the communication between said master cylinder and said rear wheel brake cylinder and to establish the communication between said rear wheel brake cylinder and a reservoir upon energizing thereof, a second electromagnetic valve interposed beween said first electromagnetic valve and said rear wheel brake cylinder and being normally open and a pressure reducing valve interposed in parallel with said second electromagnetic valve between said first electromagnetic valve and said rear wheel brake cylinder;
   means electrically connected with said control means for selectively energizing and de-energizing said first and second electromagnetic valve so as to operate in response to braking operation of said vehicle by said master cylinder in accordance with the relationship $\alpha s < \alpha w$ and $Vs - Vw = \Delta V$ where $\alpha s$ is a predetermined deceleration rate of a rear wheel of the vehicle, $\alpha w$ is an actual deceleration of said rear wheel, $Vs$ is a first predetermined velocity standard of said rear wheel, $Vw$ is the rotational velocity of the rear wheel and $\Delta V$ is a predetermined velocity differential.

3. An anti-skid brake control system as set forth in claim 2, wherein said means for selectively energizing and de-energizing said first and second electromagnetic valves is operable in accordance with the relationship $$\Delta T > Tj$$

wherein $\Delta T$ is a time differential from the time of energizing said first electromagnetic valve and $Tj$ is the time period for changing a predetermined velocity standard from said predetermined velocity to a second predetermined velocity.

4. An anti-skid brake control system as set forth in claim 1, wherein first electromagnetic valve further comprises a solenoid coil, a plunger movable in response to energizing and de-energizing of said coil, a first inlet port, a discharge port, a first ball positioned said plunger and said inlet port, a second ball positioned between said plunger and said discharge port, and biasing means for normally biasing said plunger such that said inlet port is normally open and said discharge port is normally closed, and wherein said control means further comprises a body portion having a exhaust port in communication with said master cylinder, a one-way valve in communication with said exhaust port and reservoir means which includes a cylindrical bore formed in said body portion, a piston slidably positioned within said cylindrical bore so as form a hydraulic chamber on a first axial side piston and an air chamber on a second axial side of said piston, said hydlaulic chamber interconnecting said exhaunt port and said discharge port.

5. An anti-skid brake control system as set forth in claim 1, wherein said second electromagnetic valve includes a solenoid coil, a plunger movable in response to energizing and de-energizing of said coil and forming a chamber at one end thereof, a first and second outlet ports in communication with said chamber, a ball positioned between said plunger and said first outlet, and means for normally biasing said plunger such that said first outlet port is in an open position.

6. An anti-skid brake control system as set forth in claim 1, wherein first electromagnetic valve further comprises solenoid coil, a plunfer movable in response to energizing and de-energizing of said coil, a first inlet port, a discharge port, a first ball positioned between said plunger and said inlet port, a second ball positioned between said plunger and said discharge port, and biasing means for normally biasing said plunger such that said inlet port is normally open and said discharge port is normally closed, and wherein said control means further comprises a body portion having a exhaust port in communication with said master cylinder, a one-way valve in communication with said exhaust port and reservoir means which includes a cylindrical bore formed in said body portion, a piston slidably positioned within said cylindrical bore so as to form a hydraulic chamber on a first axial side of said piston and an air chamber on a second axial side of said piston, said hydraulic chamber interconnecting said exhaust port and said discharge port;

said second electromagnetic valve including a solenoid coil, a plunger movable in response to energizing and de-energizing of said coil forming a chamber at one end thereof, a first and second outlet port in communication with said chamber, a ball positioned between said plunger and said first outlet, and means for normally biasing said plunger such that said first outlet port is in an open position.

7. An anti-skid brake control system as set forth in claim 1, wherein said pressure reducing valve further comprises a stepped bore which is in communication with said second outlet port of said second electromagnetic valve and in communication with said chamber, a valve piston slidably positioned in said stepped bore and having a valve portion cooperatively engageable with a valve seat positioned in said stepped bore, and means for normally biasing said valve piston such that said valve portion disengages with said valve seat.

8. An anti-skid brake control system as set forth in claim 4, wherein said pressure reducing valve further comprises a stepped bore which is in communication with said second outlet port of said second electromagnetic valve and in communication with said chamber, a valve piston slidably positianed in said stepped bore and having a valve portion coopertively engageable with a valve seat, positioned in said stepped bore, and means for normally biasing said valve piston such that said valve portion disngages with said valve seat.

9. An anti-skid brake control system as set forth in claim 5, wherein said pressure reducing valve further comprises a stepped bore which is in communication with said second outlet port of said second electromagnetic valve and in communication with said chamber, valve piston slidably positioned in said stepped bore and having a valve portion cooperatively engageable with a valve seat posotioned in said stepped bore, and means for normally biasing said valve piston such that said valve portion disengages with said valve seat.

10. An anti-skid brake control system as set forth in claim 6, wherein said pressure reducing valve further comprises a stepped bore which is in communication with said second outlet port of said second electromagnetic valve and in communication with said chamber, a valve piston slidably positioned in said stepped bore and having a valve portion cooperatively engageable with a valve seat positioned in said stepped bore, and means for normally biasing said valve pistonsuch that said valve portion disengages with said valve seat.

11. An anti-skid brake control system as set forth in claim 1, further comprising proportioning valve means interconnecting said master cylinder and said first inlet port of said first electromagnetic valve and for proportioning fluid flow therethrough from said master cylinder.

12. A method for anti-skid brake control of a vehicle utilizing a first and second electromagnetic valve that controls operation of at least one rear wheel and at least one rear brake of said vehicle, which comprises:

registering a first predetermined rear wheel rotational velocity standard and a predetermined rear wheel deceleration rate upon braking of said vehicle;

registering an actual rear wheel deceleration rate of said vehicle;

establishing a predetermined velocity differential for operation of said first electromagnetic valve;

establishing a second predetermined rear wheel rotational velocity standard;

calculating a time period for changing from said first velocity standard to said second velocity standard;

comparing said predetermined deceleration rate with said actual deceleration rate;

comparing said predetermined velocity differential with the difference between said first and second velocity standards when said actual deceleration rate is less than said predetermined deceleration rate;

energizing said first electromagnetic valve when said difference between said first and second velocity standards is equal to said predetermined velocity-differential; and automatically controlling operation of said rear brake by energizing and de-energizing said first and second electromagnetic valves by comparison of the time period of energizing said first electromagnetic valve with said calculated time period for changing from said first velocity standard to said second velocity standard.

* * * * *

UNITED STATES PATENT AND TRADEMARK OFFICE
CERTIFICATE OF CORRECTION

PATENT NO. : 4,552,413  Page 1 of 3

DATED : November 12, 1985

INVENTOR(S) : FUJII ET AL

It is certified that error appears in the above-identified patent and that said Letters Patent is hereby corrected as shown below:

In the Abstract, line 3, delete "a";

line 4, delete "the";

Column 1, line 29, after "very" insert --short--;

Column 2, line 66, change "54a," to --54, a--;

Column 3, line 14, change "detacts" to --detects--;

line 53, change "reached" to --reaches--;

Column 4, line 11, change "electrotero-" to --electro---;

line 35, change "sheels" to --wheels--;

line 45, delete "their";

line 48, change "vakve" to --valve--;

Column 5, line 16, change "(Which" to --(which--;

UNITED STATES PATENT AND TRADEMARK OFFICE
CERTIFICATE OF CORRECTION

PATENT NO. : 4,552,413

DATED : November 12, 1985

INVENTOR(S) : FUJII ET AL

It is certified that error appears in the above-identified patent and that said Letters Patent is hereby corrected as shown below:

Column 6, line 61, change "a exhaust" to --an exhaust--;

line 66, change "form" to --to form--;

line 68, change "hydlaulic" to --hydraulic--;

Column 7, line 1, change "exhaunt" to --exhaust--;

line 7, change "a first" to --first--;

line 14, change "plunfer" to --plunger--;

line 22, change "a exhaust" to --an exhaust--;

line 35, change "coil forming" to --coil and forming--;

line 56, change "positianed" to --positioned--;

line 57, change "coopertively" to --cooperatively--;

line 60, change "disngages" to --disengages--;

UNITED STATES PATENT AND TRADEMARK OFFICE
CERTIFICATE OF CORRECTION

PATENT NO. : 4,552,413

DATED : November 12, 1985

INVENTOR(S) : FUJII ET AL

It is certified that error appears in the above-identified patent and that said Letters Patent is hereby corrected as shown below:

Column 8. line 6, change "valve" to --a valve--;

line 8, change "posotioned" to --positioned--;

line 19, change "pistonsuch" to --piston such--.

Signed and Sealed this

Eleventh Day of March 1986

[SEAL]

Attest:

DONALD J. QUIGG

Attesting Officer

Commissioner of Patents and Trademarks